US011262959B1

(12) United States Patent
Morales

(10) Patent No.: US 11,262,959 B1
(45) Date of Patent: Mar. 1, 2022

(54) METHODS AND SYSTEMS FOR INK USE ESTIMATION

(71) Applicant: KYOCERA DOCUMENT SOLUTIONS INC., Osaka (JP)

(72) Inventor: Javier A. Morales, Rochester, NY (US)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 17/090,222

(22) Filed: Nov. 5, 2020

(51) Int. Cl.
  *G06F 3/12* (2006.01)
  *G06Q 10/10* (2012.01)
  *G06Q 30/02* (2012.01)
  *G06F 16/28* (2019.01)
  *G06K 15/02* (2006.01)

(52) U.S. Cl.
  CPC .......... *G06F 3/1262* (2013.01); *G06F 3/1219* (2013.01); *G06F 3/1232* (2013.01); *G06F 3/1239* (2013.01); *G06F 16/285* (2019.01); *G06K 15/1877* (2013.01); *G06Q 10/10* (2013.01); *G06Q 30/0283* (2013.01); *G06F 3/1288* (2013.01)

(58) Field of Classification Search
  None
  See application file for complete search history.

(56) References Cited

U.S. PATENT DOCUMENTS

| | | | |
|---|---|---|---|
| 6,854,839 B2 | 2/2005 | Collier et al. | |
| 6,991,319 B2 | 1/2006 | Zerza et al. | |
| 8,047,626 B1 | 11/2011 | Derhak et al. | |
| 8,379,232 B2 | 2/2013 | Hasegawa et al. | |
| 9,656,463 B1 | 5/2017 | Ernst et al. | |
| 10,261,735 B2 | 4/2019 | Sakurai et al. | |
| 2009/0162090 A1* | 6/2009 | Shimada | G03G 15/5029 399/82 |
| 2011/0026948 A1* | 2/2011 | Nagasu | G03G 21/12 399/35 |
| 2019/0283440 A1 | 9/2019 | Yokouchi et al. | |
| 2019/0302672 A1* | 10/2019 | Osawa | G03G 15/6582 |

* cited by examiner

*Primary Examiner* — Fan Zhang
(74) *Attorney, Agent, or Firm* — GrowIP Law Group LLC

(57) ABSTRACT

In one aspect, a computer-implemented method for estimating ink use by a printer is provided. The method involves receiving, by a computer, a request for a comingled print job comprising a plurality of print jobs to be carried out by the printer. The method also involves traversing, by the computer, pages of the comingled print job and identifying, for each page of the comingled print job, a print job of the plurality of print jobs to which the page belongs. The method also involves for each of the plurality of print jobs, calculating, by the computer, an estimated total amount of ink required for printing the print job. The method also involves communicating, by the computer, to a client terminal, the estimated total amounts of ink required for printing the plurality of print jobs.

20 Claims, 5 Drawing Sheets

QUOTE RECORDS 200

| ID | CLIENT INFORMATION | JOB INFORMATION | FRONT-END PARAMETERS | PRINT ENGINE PARAMETERS | CONSUMABLES ESTIMATE | COST ESTIMATE |
|---|---|---|---|---|---|---|
| 1 | CLIENT A | 100K PAGES PER MONTH | P1=X, P2=Y | P1=E, P2=F | 10C, 5M, 10Y, 12K | $0.15 |
| 2 | CLIENT B | 150K PAGES PER MONTH | P1=A, P2=B | P1=G, P2=H | 10C, 5M, 10Y, 12K | $0.11 |
| ... | | | | | | |

FIG. 2

METHODS AND SYSTEMS FOR INK USE ESTIMATION

BACKGROUND

Estimating the amount of printer consumables required for a particular print job is an important consideration for printing services. For example, a printing service can provide services to a client that can have thousands of customers (e.g., an acquiring bank associated with credit/debit cards). The client can enter into a contract with the printing service to have statements printed and sent (e.g., via mail) to the client's customers. Terms of the contract can specify, for example, a cost per print job or a cost per page (e.g., one cent per page).

Determination of the cost can involve estimating the amount of printer consumables that will be consumed in processing the print job. In some cases, the printing service can estimate this amount by printing a limited number of sample pages that are representative of the larger print job. The amount of printer consumables consumed during this limited run can be used as the basis for determining the cost for the entire print job.

SUMMARY

In one aspect, a computer-implemented method for estimating ink use by a printer is provided. The method involves receiving, by a computer, a request for a print job to be carried out by the printer. The method also involves classifying, by the computer, pages of the print job into groups, each group corresponding to related pages of the print job. The method also involves for each of the groups: calculating, by the computer, for each page classified into the group, an estimated amount of ink required for printing the page, and calculating, by the computer, an estimated average amount of ink required for printing pages of the group based on the estimated amounts of ink required for printing the pages of the group. The method also involves determining, by the computer, that the estimated average amount of ink for at least a subset of the groups satisfies a set of predefined conditions. The method also involves in response to determining that the estimated average amount of ink for at least the subset of the groups satisfies the set of predefined conditions, discontinuing, by the computer, the calculation of estimated amounts of ink for pages classified into at least the subset of the groups. The method also involves calculating, by the computer, for each of the groups, an estimated total amount of ink required for printing the pages in the group based on the estimated average amount of ink for the group and a number of pages in the group. The method also involves communicating, by the computer, to a client terminal, an estimated total amount of ink required for printing the print job, wherein the estimated total amount of ink is based on the estimated total amounts of ink for the groups.

In another aspect, a system is provided. The system includes a memory that stores instruction code. The system also includes a processor in communication with the memory. The instruction code is executable by the processor to perform operations. The operations include receiving a request for a print job to be carried out by a printer. The operations also include classifying pages of the print job into groups, each group corresponding to related pages of the print job. The operations also include for each of the groups: calculating, for each page classified into the group, an estimated amount of ink required for printing the page, and calculating an estimated average amount of ink required for printing pages of the group based on the estimated amounts of ink required for printing the pages of the group. The operations also include determining that the estimated average amount of ink for at least a subset of the groups satisfies a set of predefined conditions. The operations also include in response to determining that the estimated average amount of ink for at least the subset of the groups satisfies the set of predefined conditions, discontinuing the calculation of estimated amounts of ink for pages classified into at least the subset of the groups. The operations also include calculating, for each of the groups, an estimated total amount of ink required for printing the pages in the group based on the estimated average amount of ink for the group and a number of pages in the group. The operations also include communicating, to a client terminal, an estimated total amount of ink required for printing the print job, wherein the estimated total amount of ink is based on the estimated total amounts of ink for the groups.

In another aspect, an article of manufacture is provided. The article of manufacture includes non-transitory data storage storing at least computer-readable instructions that, when executed by one or more processors of a computer, cause the computer to perform operations. The operations include receiving a request for a print job to be carried out by a printer. The operations also include classifying pages of the print job into groups, each group corresponding to related pages of the print job. The operations also include for each of the groups: calculating, for each page classified into the group, an estimated amount of ink required for printing the page, and calculating an estimated average amount of ink required for printing pages of the group based on the estimated amounts of ink required for printing the pages of the group. The operations also include determining that the estimated average amount of ink for at least a subset of the groups satisfies a set of predefined conditions. The operations also include in response to determining that the estimated average amount of ink for at least the subset of the groups satisfies the set of predefined conditions, discontinuing the calculation of estimated amounts of ink for pages classified into at least the subset of the groups. The operations also include calculating, for each of the groups, an estimated total amount of ink required for printing the pages in the group based on the estimated average amount of ink for the group and a number of pages in the group. The operations also include communicating, to a client terminal, an estimated total amount of ink required for printing the print job, wherein the estimated total amount of ink is based on the estimated total amounts of ink for the groups.

In yet another aspect, another computer-implemented method for estimating ink use by a printer is provided. The method involves receiving, by a computer, a request for a print job to be carried out by the printer, wherein the print job comprises multiple pages to be printed. The method also involves traversing, by the computer, the pages of the print job and calculating, for each page of the print job, an estimated amount of ink required for printing the page, wherein the traversing begins at a first page selected from the pages of the print job. The method also involves while traversing the pages of the print job and calculating, for each page of the print job, the estimated amount of ink required for printing the page: calculating, by the computer, at a first predefined interval of a plurality of predefined intervals, a first snapshot of an estimated average amount of ink required for printing a number of traversed pages, and at each of the plurality of predefined intervals following the first predefined interval, and until a predefined ink use condition is satisfied, (i) calculating, by the computer, an updated snapshot of an estimated average amount of ink required for printing the number of traversed pages and (ii) comparing, by the computer, the updated snapshot to a preceding snapshot, wherein the predefined ink use condition relates to an output of the comparison between the updated snapshot and the preceding snapshot. The method also involves in response to the predefined ink use condition being satisfied, calculating, by the computer, an estimated total amount of ink required for printing the print job, wherein the estimated total amount of ink for printing the print job is based on the updated snapshot and a total number of pages of the print job. The method also involves communicating, by the computer, to a client terminal, the estimated total amount of ink required for printing the print job.

In yet another aspect, another system is provided. The system includes a memory that stores instruction code. The system also includes a processor in communication with the memory. The instruction code is executable by the processor to perform operations. The operations include receiving a request for a print job to be carried out by a printer, wherein the print job comprises multiple pages to be printed. The operations also include traversing the pages of the print job and calculating, for each page of the print job, an estimated amount of ink required for printing the page, wherein the traversing begins at a first page selected from the pages of the print job. The operations also include while traversing the pages of the print job and calculating, for each page of the print job, the estimated amount of ink required for printing the page: calculating, at a first predefined interval of a plurality of predefined intervals, a first snapshot of an estimated average amount of ink required for printing a number of traversed pages, and at each of the plurality of predefined intervals following the first predefined interval, and until a predefined ink use condition is satisfied, (i) calculating an updated snapshot of an estimated average amount of ink required for printing the number of traversed pages and (ii) comparing the updated snapshot to a preceding snapshot, wherein the predefined ink use condition relates to an output of the comparison between the updated snapshot and the preceding snapshot. The operations also include in response to the predefined ink use condition being satisfied, calculating, an estimated total amount of ink required for printing the print job, wherein the estimated total amount of ink for printing the print job is based on the updated snapshot and a total number of pages of the print job. The operations also include communicating, to a client terminal, the estimated total amount of ink required for printing the print job.

In yet another aspect, another article of manufacture is provided. The article of manufacture includes non-transitory data storage storing at least computer-readable instructions that, when executed by one or more processors of a computer, cause the computer to perform operations. The operations include receiving a request for a print job to be carried out by a printer, wherein the print job comprises multiple pages to be printed. The operations also include traversing the pages of the print job and calculating, for each page of the print job, an estimated amount of ink required for printing the page, wherein the traversing begins at a first page selected from the pages of the print job. The operations also include while traversing the pages of the print job and calculating, for each page of the print job, the estimated amount of ink required for printing the page: calculating, at a first predefined interval of a plurality of predefined intervals, a first snapshot of an estimated average amount of ink required for printing a number of traversed pages, and at each of the plurality of predefined intervals following the first predefined interval, and until a predefined ink use condition is satisfied, (i) calculating an updated snapshot of an estimated average amount of ink required for printing the number of traversed pages and (ii) comparing the updated snapshot to a preceding snapshot, wherein the predefined ink use condition relates to an output of the comparison between the updated snapshot and the preceding snapshot. The operations also include in response to the predefined ink use condition being satisfied, calculating, an estimated total amount of ink required for printing the print job, wherein the estimated total amount of ink for printing the print job is based on the updated snapshot and a total number of pages of the print job. The operations also include communicating, to a client terminal, the estimated total amount of ink required for printing the print job.

In yet another aspect, yet another computer-implemented method for estimating ink use by a printer is provided. The method involves receiving, by a computer, a request for a comingled print job comprising a plurality of print jobs to be carried out by the printer. The method also involves traversing, by the computer, pages of the comingled print job and identifying, for each page of the comingled print job, a print job of the plurality of print jobs to which the page belongs. The method also involves for each of the plurality of print jobs, calculating, by the computer, an estimated total amount of ink required for printing the print job. The method also involves communicating, by the computer, to a client terminal, the estimated total amounts of ink required for printing the plurality of print jobs.

In yet another aspect, yet another system is provided. The system includes a memory that stores instruction code. The system also includes a processor in communication with the memory. The instruction code is executable by the processor to perform operations. The operations include receiving a request for a comingled print job comprising a plurality of print jobs to be carried out by a printer. The operations also include traversing pages of the comingled print job and identifying, for each page of the comingled print job, a print job of the plurality of print jobs to which the page belongs. The operations also include for each of the plurality of print jobs, calculating an estimated total amount of ink required for printing the print job. The operations also include communicating, to a client terminal, the estimated total amounts of ink required for printing the plurality of print jobs.

In yet another aspect, yet another article of manufacture is provided. The article of manufacture includes non-transitory data storage storing at least computer-readable instructions that, when executed by one or more processors of a computer, cause the computer to perform operations. The operations include receiving a request for a comingled print job comprising a plurality of print jobs to be carried out by a printer. The operations also include traversing pages of the comingled print job and identifying, for each page of the comingled print job, a print job of the plurality of print jobs to which the page belongs. The operations also include for each of the plurality of print jobs, calculating an estimated total amount of ink required for printing the print job. The operations also include communicating, to a client terminal, the estimated total amounts of ink required for printing the plurality of print jobs.

Other aspects, embodiments, and implementations will become apparent to those of ordinary skill in the art by reading the following detailed description, with reference where appropriate to the accompanying drawings.

BRIEF DESCRIPTION OF THE FIGURES

FIG. 2 illustrates examples of quote records, in accordance with at least some example embodiments.

DETAILED DESCRIPTION

Figure 1:
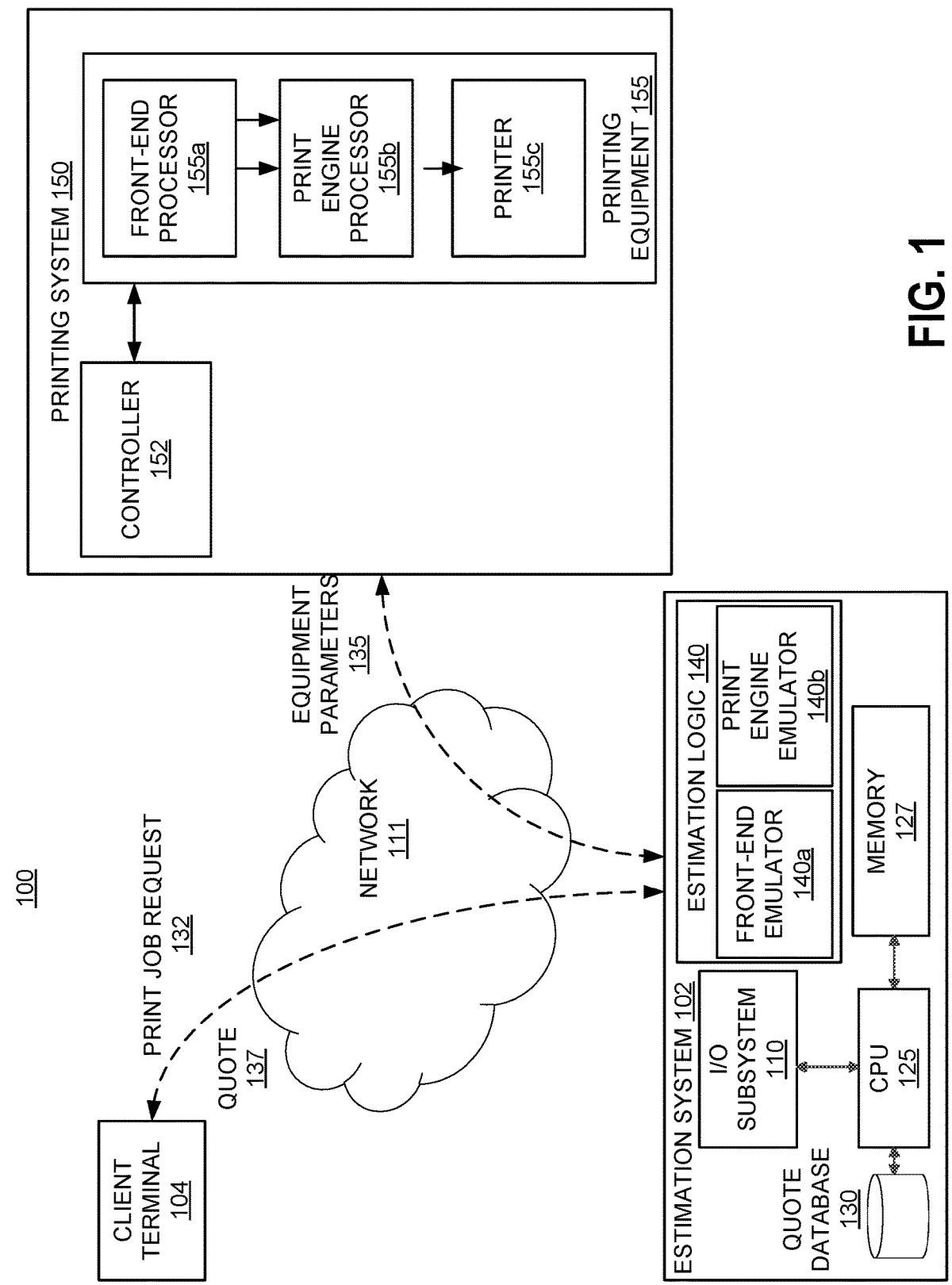
FIG. 1 is a schematic block diagram illustrating a system for intelligent control of printing operations, in accordance with at least some example embodiments.

In the following detailed description, reference is made to the accompanying figures, which form a part hereof In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

I. OVERVIEW

Implementations of this disclosure provide technological improvements that are particular to printing technology, such as those related to estimating the amount of ink used by a printer when carrying out the printing of print jobs (also referred to herein as "jobs," for brevity). While embodiments of the present disclosure will be described herein primarily in the context of printing media products that take the form of pages of paper documents, it should be understood that the present disclosure can be applicable to estimating other types of printer consumables, such as toner for printing pages and/or filaments or other materials consumed when three-dimensional (3D). Other examples are possible as well.

Furthermore, a print job can, at times, involve printing multiple copies of a document or documents. Thus, the term "print job," as used herein, encompasses however many copies of the document are specified in the request for the print job.

Existing estimation systems typically estimate ink use for a print job—that is, an estimate of the total amount of ink that will be needed to print all of the pages of the print job—by using a portion of the print job. In particular, a portion of the print job is rasterized (e.g., using a raster image processor (RIP) and the ink use is estimated for that portion based on the rasterization. However, this rasterization can often take more time than desired, even on high performance systems, or, depending on the type of rasterization used, the accuracy of the ink estimation might be lower quality. Further, it can be difficult with existing ink use estimation techniques to determine how large of a portion of the print job should be used for the estimation. For example, if the number of pages selected for estimation is too low, the estimation accuracy might be low quality. On the other hand, if the number of pages selected for estimation is too high, more time and computational resources might be required to complete the estimation than desired, which can, in turn, take time and computational resources away from other processing steps that might be needed when processing the print job.

Existing estimation systems also might not be as efficient or reliable in handling ink use estimation for comingled print jobs. A comingled print job is a single print job comprised of a plurality of print jobs, each of which might be associated with a respective different entity (e.g., different corporations who have submitted printing requests). For example, a comingled job might take the form of a single print file (e.g., a .zip file or other type of file) comprised of a plurality of electronically comingled print files corresponding to a plurality of print jobs. In some situations, the plurality of print jobs that make up the comingled job may be unrelated jobs that were combined to maximize postal discounts. When estimating comingled jobs, existing estimation systems might require print shop staff to go through the comingled print job and separate the jobs so that the jobs can be separately estimated and priced, which can be inefficient and have other disadvantages as well.

To address the above-noted issues, the present disclosure provides an improved estimation system that provides more reliable, accurate, and efficient ink use estimation for print jobs, including comingled print jobs. Such improved ink use estimation can thus facilitate more reliable, accurate, and efficient cost estimation for ink usage. The disclosed ink use estimation processes are primarily and advantageously implemented before the print job is sent to, and printed by, the printer.

Implementations described below are for purposes of example. The implementations described below, as well as other implementations, may provide other improvements as well.

II. EXAMPLE COMPUTER ENVIRONMENT

FIG. 1 illustrates an example of an environment 100 that includes various entities that cooperate to facilitate estimating printer consumables. Example entities of the environment 100 can include an estimation system 102, a client terminal 104, and a printing system 150. The various entities of the environment 100 can be configured to communicate with one another via a network 111, such as the Internet.

The printing system 150 can include a controller 152 and printing equipment 155. An example of the controller 152 can be configured to coordinate operations performed the printing equipment 155. For example, the controller 152 can be configured to receive print job requests 132 from entities outside of the printing system 150 and to communicate the print job requests 132 to the printing equipment 155. As described in more detail below, the controller 152 can be further configured to monitor equipment parameters 135 associated with the printing equipment 155 and to communicate this information to the estimation system 102.

As noted above, the printing equipment 155 can include an FEP 155*a*, a PEP 155*b*, and one or more printers 155*c*. The FEP 155*a* can be configured to convert bitmap images, vector graphics, fonts, etc., associated with pages specified in the print job request to a bitmap/rasterized representation of the image (e.g., C, M, Y, and K pixels). The manner in which the FEP 155*a* rasterizes the pages specified in the print job request can depend on various image rasterization parameters of the FEP 155*a*. For example, these image rasterization parameters may include and/or effect calibration curves, paper definitions, international color consortium profiles (ICC profiles), spot color definitions, tone adjustment curves, color conversion settings, colorant limits (e.g., ink, toner), rendering intent, K preservation, CGR level, etc., max colorant densities, print margin, and/or halftones.

An example of the PEP 155*b* can be included or in communication with the printer 155*c*. The printer 155*c* can correspond to an industrial printer capable of printing thousands of pages an hour. In this regard, the printer 155*c* can be ink-based, toner-based, or can used a different medium. The PEP 155*b* can include various parameters that can control the operation of the printer 155*c*, and, therefore, the amount of printer consumables required by the printer. Within examples, these parameters can include printer maintenance parameters that can control and/or effect head cleaning intervals, head clogging prevention intervals, etc., of the printer 155*c*, spitting (i.e., printing spray pattern over all content), the printing of purge sheets, the printing of spit lines (i.e., lines printed between page frames in a roll-fed printer to ensure that all jets of the print head of the printer fire).

An example of the estimation system 102 can correspond to a computer, such as a tablet, laptop, smartphone, and/or any other device that facilitates user interactions. The estimation system 102 can include a memory 127 and a processor 125. The estimation system 102 can include other subsystems. Within examples, these subsystems can include an input/output (I/O) subsystem 110, a quote database 130, and estimation logic 140. Details related to the various subsystems of the estimation system 102 and the operations performed by these subsystems are described in further detail below.

The processor 125 is in communication with the memory 127. The processor 125 is configured to execute instruction code stored in the memory 127. The instruction code facilitates performing, by the estimation system 102, various operations that facilitate estimating consumables that may be required by the printing system 150. In this regard, the instruction code can cause the processor 125 to control and coordinate various activities performed by the different subsystems of the estimation system 102. The processor 125 can correspond to a stand-alone computer system such as an Intel®, AMD®, or ARM® based computer system or a different computer system and can include application-specific computer systems. The computer system can include an operating system, such as Microsoft Windows®, Linux, Unix®, Mac OS®, or a different operating system.

An example of the I/O subsystem 110 can include one or more input, output, or input/output interfaces and is configured to facilitate communications with entities outside of the estimation system 102. In this regard, an example of the I/O subsystem 110 can be configured to dynamically determine the communication methodology utilized by entities of the environment 100 and can communicate information to the entities with an interface that uses a determined communication methodology. For example, the I/O subsystem 110 can determine that a first entity utilizes a RESTful API and can, therefore, communicate with the entity using an interface that uses a RESTful communication methodology.

An example of the estimation logic 140 can be configured to estimate the amount of printer consumables required by a printer 155*c* in processing a particular print job request 132. In this regard, the estimation logic 140 can implement the FE 140*a* and the PE 140*b* described above. The FE 140*a* and the PE 140*b* can be configured with equipment parameters 135 that match the equipment parameters 135 associated with the FEP 154 and the PEP 155*b* of the printing system 150.

As noted above, the FE 140*a* can be configured to emulate operations performed by the FEP 155*a* of the printing system 150, which can depend on various parameters. For example, the FE 140*a* can be configured to convert bitmap images, vector graphics, fonts, etc., specified in sample pages of a print job request 132 to bitmap/rasterized representations of the pages. The manner in which FE 140*a* performs the conversion can depend on various image rasterization parameters of the FE 140*a*, which can correspond to the image rasterization parameters of the FEP 155*a* described above.

An example of the PE 140*b* can be configured to emulate operations performed by the PEP 155*b* and/or the printer 155*c* of the printing system 150, which can depend on various printer maintenance parameters, which can correspond to the printer maintenance parameters of the PEP 155*b* described above.

It is contemplated that any of the subsystems referenced herein can correspond to a stand-alone computer system such as an Intel®, AMD®, or Arm® based computer system or a different computer system and can include application-specific computer systems. The computer systems can include an operating system, such as Microsoft Windows®, Linux, Unix®, or another operating system. It is also contemplated that operations performed by the various subsystems can be combined into a fewer or greater number of subsystems to facilitate speed scaling, cost reductions, etc.

The client terminal 104 can take the form of any computing device or components thereof that is/are configured to provide audio and/or visual notifications to a user. For example, the notification device 106 can take the form of a laptop computer, smartphone, or user interface system thereof (e.g., a display device, such as a touchscreen, and/or a speaker). In some embodiments, the client terminal 104 can be configured to receive, from the estimation system 102 or the printing system 150, some form of an ink use estimate and cost associated therewith, and can then display the ink/cost estimate. In some embodiments, the estimation system 102 or the printing system 150 can take the form of a computer and the client terminal 104 can be a display device of the computer. In other embodiments, the client terminal 104 can be a separate computer that is configured to engage in communication with the estimation system 102 or the printing system 150 to facilitate receipt by the client terminal 104 of printer consumable estimates (e.g., ink use) and costs associated therewith. Other examples are possible as well.

FIG. 2 illustrates examples of quote records 200 that can be stored in the quote database 130. Each entry in quote database 130 can specify aspects associated with an estimate provided to a client for processing a particular print job request 132. Within examples, fields 205 of each entry in the quote database 130 can include an ID field 205*a*, a client information field 205*b*, a job information field 205*c*, an FE parameters field 205*d*, a PE parameters field 205*e*, a consumables estimate field 205*f*, and a cost field 205*g*. Other information can be specified in the quote records 200.

The ID field 205*a* of each entry can specify a unique value for each entry. The value of the ID field 205*a* can be automatically generated with each new entry in the quote database 130. Additionally, the value for the ID field 205*a* can be manually specified.

The client information field 205*b* of each entry can specify, for example, the name, address, phone number, email address, etc., associated with a particular client. As noted above, a particular client can submit a request for a quote for a particular print job request 132 via the client terminal 104. The request can include one or more sample pages associated with the print job request 132 (e.g., 100 random pages of a 1,000,000 page print job). Information in this field can facilitate communicating the quote 137 to the client terminal 104. At a later time, the client can communicate the entire print job request 132.

The job information field 205c of each entry can specify information indicative of the print job request 132. Within examples, the value for this field can specify information indicative of the size of the print job request 132 (e.g., 100k pages, 1 GByte). The value can specify the frequency at which the print job request 132 should be processed (e.g., monthly, bi-monthly). In some cases, the value for this field can further specify information indicative of the size of the sample that is/was used to generate the estimate (e.g., 100 pages, 1 Kbyte). Other information that further specifies the print job request 132 can be represented by the value of this field.

The front-end parameters field 205d of each entry can specify one or more values associated with various equipment parameters 135 that were utilized by the FE 140a of the estimation logic 140 in generating the estimate associated with the entry. These values can specify the image rasterization parameters described above.

The print engine parameters field 205e of each entry can specify one or more values associated with various equipment parameters 135 that were utilized by the PE 140b of the estimation logic 140 in generating the estimate associated with the entry. These parameters can specify the printer maintenance parameters described above.

The consumables estimate field 205f of each entry can specify information indicative of the amount of printer consumables (e.g., the amount of cyan, magenta, yellow and black ink) estimated to be required for a particular print job request 132. For example, the value for this field can specify the number of units (e.g., picoliter) of a particular color required for a particular print job request 132. The estimated values specified in this field can be specified in terms of the entire print job request 132, per page, etc.

The cost estimate field 205g of each entry can specify the cost associated with the print job request 132. The value of this field can be proportional to the value of the consumable estimate specified in the entry and the type of media (e.g., ink, toner) used by the printer 155c. The cost can be specified in terms of the entire print job request 132, per page, etc.

III. EXAMPLE OPERATIONS FOR ESTIMATING INK USE

A. Accelerated Ink Use Estimation

Figure 3:
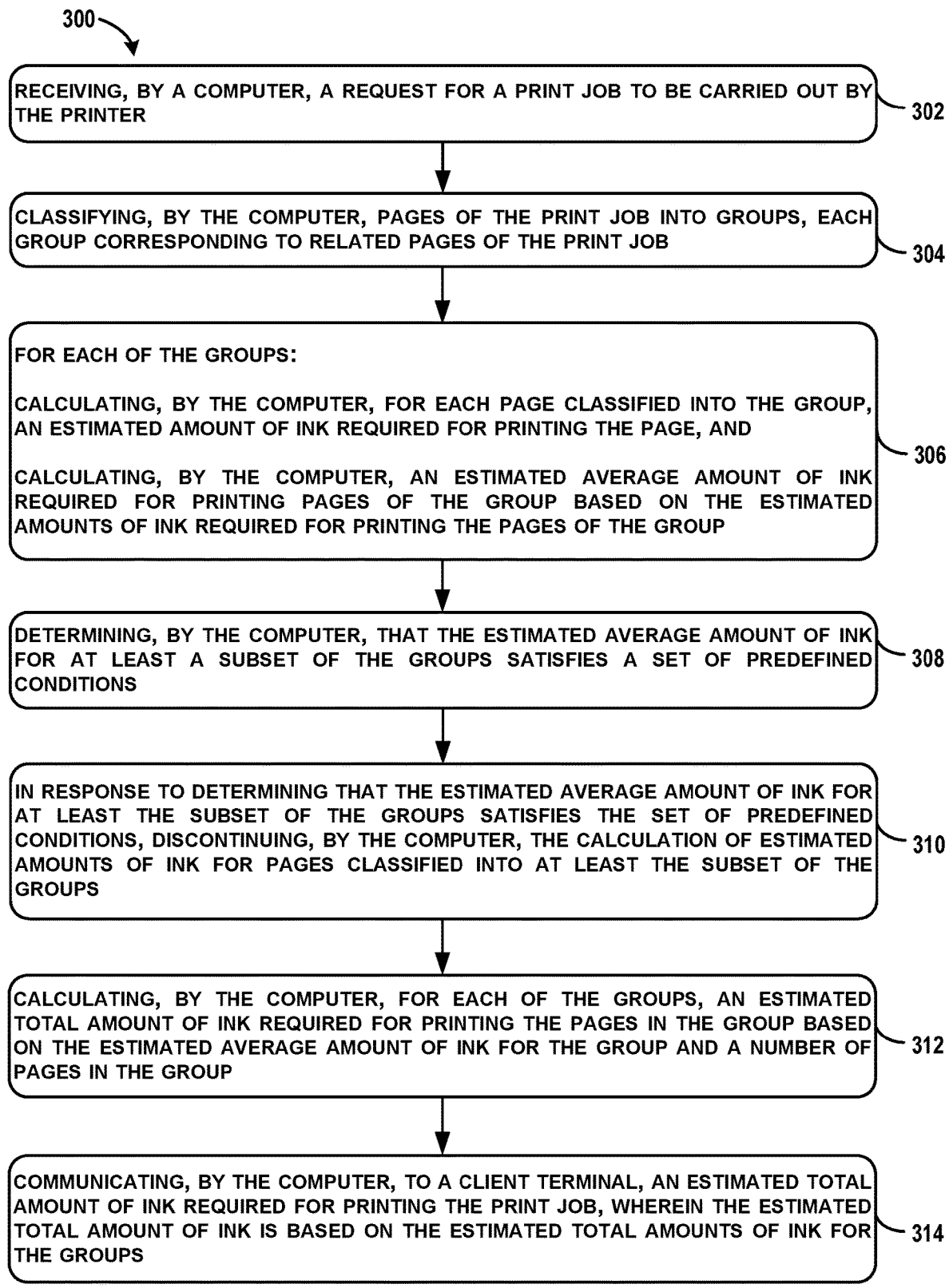
FIG. 3 illustrates a flowchart for estimating ink use by a printer, in accordance with at least some example embodiments.

FIG. 3 is a flowchart for a method, in accordance with at least some example embodiments. Method 300 represents a method for estimating ink use by a printer, which will be referred to herein as a method for "accelerated ink use estimation." Method 300 can be carried out by a computer, such as the estimation system 102 and/or the controller 152 of the printing system 150.

Block 302 of method 300 involves receiving, by a computer, a request for a print job to be carried out by the printer. The request can take the form of a print file.

Block 304 of method 300 involves classifying, by the computer, pages of the print job into groups, each group corresponding to related pages of the print job.

To facilitate this, the computer can rasterize pages at a low resolution (e.g., lower than a predefined resolution threshold), such as at a resolution between 72 dots per inch (dpi) and 300 dpi. Further, after initially classifying at least one page based on the low resolution image(s) of such page(s), the computer can then compare low resolution images of subsequent pages with the previously-determined low resolution images for preceding pages and use that comparison as a basis for classifying the subsequent pages. For example, if a low resolution image of a page has at least a threshold degree of similarity to one or more previous images that have been classified into a particular group, the page can be classified with that/those previous image(s). On the other hand, if the low resolution image of the page has at least the threshold degree of similarity to the one or more previous images, the page might be classified into a new group of pages. To facilitate these comparisons, various image comparison algorithms can be used. Using low resolution rasterizations for the classification process (as opposed to higher resolution or full resolution rasterizations) can make the classification process, and in turn, the accelerated ink use estimation process, more efficient. Alternatively, there may be situations in which high resolution rasterizations (i.e., higher than the low resolution rasterizations described above, or higher than a predefined resolution threshold), such as 600 dpi or higher, can be used for the classification process without expending more computational resources and time than desired. Other classification techniques can be used as well.

As an example of this technique, consider a situation in which the print job includes three, four-page documents, each of which having a different first page and the same second, third, and four pages. In this situation, the computer might classify these pages into six separate groups—one for each first page, one for the second page, one for the third page, and one for the fourth page. Thus, after an initial classification of these six groups, the computer can thereafter group subsequent copies of the second page into the same group as the first copy of the second page that was classified. The computer can group subsequent copies of the third page and the fourth page in a similar way. The result of this classification/grouping of the three, four page documents can be, a first group including one variation of the first page, a second group including another variation of the first page, a third group including yet another variation of the first page, a fourth group including three of the second page, a fifth group including three of the third page, and a sixth group including three of the fourth page. Other examples are possible as well.

An example advantage of classifying pages in the manner described above is to help ensure that there is little variation between pages that are being compared. Other advantages are possible as well.

Referring back to FIG. 3, block 306 of method 300 involves for each of the groups: calculating, by the computer, for each page classified into the group, an estimated amount of ink required for printing the page, and calculating, by the computer, an estimated average amount of ink required for printing pages of the group based on the estimated amounts of ink required for printing the pages of the group. In other words, the computer can keep track of the average ink use per-group.

To facilitate this, in addition to rasterizing the pages at low resolution for the purposes of classification, the computer can also rasterize the pages at a high resolution, such as full resolution (e.g., 600 dpi or 1200 dpi) and the computer can use the higher resolution images of the pages for ink use estimation. That is, in some embodiments, pages can be rasterized twice—once at low resolution for the purposes of classifying the pages, and again at high resolution for the purposes of ink use estimation. By using higher resolution for ink use estimation, the accuracy of the estimation can be increased. As pages continue to be rasterized in the manners discussed above, the computer can continue classifying and calculating/storing an ink use estimation for each page, at least until one or more conditions are met, as described in more detail below.

In some embodiments, the act of calculating the estimated average amount of ink required for printing pages of the group based on the estimated amounts of ink required for printing the pages of the group can be performed using the adaptive ink use estimation described in more detail in the following section of the present disclosure.

Referring back to FIG. 3, block 308 of method 300 involves determining, by the computer, that the estimated average amount of ink for at least a subset of the groups satisfies a set of predefined conditions (e.g., at least one of the groups).

Block 310 of method 300 involves in response to determining that the estimated average amount of ink for at least the subset of the groups satisfies the set of predefined conditions, discontinuing, by the computer, the calculation of estimated amounts of ink for pages classified into at least the subset of the groups.

The set of predefined conditions can include one or more conditions including, but not limited to, a condition that a standard deviation of the estimated average amount of ink per page for each group of at least the subset of the groups remains less than a predefined threshold deviation across a predefined number of pages (e.g., across 100 pages) that have been classified by the computer. As another example, the computer can take multiple snapshots of a given group over time and determine how those snapshots change. In such an example, the set of predefined conditions can include a condition that a standard deviation of the estimated average amount of ink per page for each group of at least the subset of the groups remains less than a predefined threshold deviation across a predefined number of snapshots taken by the computer (e.g., across 5 snapshots, taken after every 20 pages have been classified) of estimated average amounts of ink per page for the group.

As another example, the set of predefined conditions can include a condition that a standard deviation of the estimated average amount of ink per page for each group of at least the subset of the groups remains less than a predefined threshold deviation for longer than a predefined duration of time. Alternatively, a condition might be that that the standard deviation of the estimated average amount of ink per page for each group of at least the subset of the groups is less than the predefined threshold deviation, without taking into account the number of classified pages, snapshots, or time. Other example conditions are possible as well.

As a more particular example of determining that the set of predefined conditions are met, the computer can calculate the estimated average amount of ink for a given group every w pages, where w is an integer (e.g., 20). As the computer performs ink estimation in this way, the computer can determine the standard deviation for the last N average ink use values, where N is an integer (e.g., 10), as well as the overall standard deviation across all estimated pages. As more and more pages are classified into the group and estimated, the last N average ink use values can start to converge so that there is less variation between those values, which will shrink the standard deviation for the ink use estimates until it falls below the predefined threshold deviation. Consider, for instance, a situation in which a page is using an average of 16 microliters of ink, N is 4, and the predefined threshold deviation for the predefined condition is 5. When estimation first starts for pages in a group, the following respective values for ink use (in microliters) of four pages might be obtained: 5, 20, 12, 8, which have a standard deviation of 5.629. As estimation of pages continues, the following respective values might be obtained for additional pages classified into the group: 16, 2, 18, 14, which have a standard deviation of 6.22 and bring the overall standard deviation to 5.96. Further, as estimation continues, the following respective values might be obtained for additional pages classified into the group: 13, 6, 18, 10, which have a standard deviation of 4.38 and bring the overall standard deviation to 5.48. Yet further, as estimation continues, the following respective values might be obtained for additional pages classified into the group: 13, 10, 9, 12, which have a standard deviation of 1.58 and bring the overall standard deviation to 4.83, thus bringing the overall standard deviation below the predefined threshold deviation of 5 and satisfying the condition. Over time, the standard deviation will likely drop as outlier pages become a smaller portion of the estimated pages, and the computer might use this drop as the threshold (either directly, or expressed as a percentage deviation from average ink use per page).

In some examples, the set of predefined conditions can include a condition that a standard deviation in the standard deviations themselves is less than a predefined second threshold deviation. The standard deviation in the standard deviations can indicate how much the change in ink use is changing, and can be another useful condition on its own or in combination with one or more other conditions described herein. As an example, considering the situation described above, the standard deviation in the standard deviations (5.629, 6.22, 4.38, 1.58) is 1.78, and the computer can be configured to determine that the set of predefined conditions has been met if the standard deviation in the standard deviations is less than 2. Other examples are possible as well.

Further in response to determining that the estimated average amount of ink for at least the subset of the groups satisfies the set of predefined conditions, and even though discontinuing ink use estimation for pages classified into at least the subset of the groups, the computer can continue classifying the pages of the print job into the groups. In other words, once the change in the average ink use for a particular group falls below the predefined threshold deviation (and, optionally, remains below that threshold for at least the predefined duration of time), the computer can stop calculating estimated ink use for pages that are classified as belonging to that group, but can continue classifying pages into that group. As such, once the set of predefined conditions are satisfied, the computer can stop estimating ink use for groups and instead switch to a "classification only" mode where, although the computer has discontinued ink use estimation, the computer continues to classify pages. By discontinuing ink use estimation for groups that meet the set of predefined conditions, the ink use estimation process as a whole can be sped up and less computational resources can be expended since the higher resolution rasterizations involved in calculating estimated ink use for those groups is discontinued.

As pages are initially classified into groups and ink use is estimated for those groups, the average ink use per page can vary within each group. But the set of predefined conditions being satisfied for a particular group might indicate that the average ink uses being estimated for that group thus far have stabilized and regressed to a mean and, if more pages were to be classified and estimated, approximately that same average ink use would be likely to continue for that group, even as new pages are classified into that group. Thus, the average ink use for that group that has been calculated up to the point where the set of predefined conditions were satisfied can be used for calculating the total estimated ink use for that group once the classification phase is completed. As an example, the regression to the mean can be calculated by the computer repeatedly looking at the mean after specified numbers of pages have been classified (e.g., 50, 100, 150, 200) and then calculating (i) the difference from the mean at those points and (ii) the overall mean.

In some embodiments, the act of continuing classifying the pages of the print job into the groups can involve continuing classifying the pages of the print job into the groups using the rasterization of the pages at the low resolution. That is, the computer can continue classifying pages at a low resolution, such as the same resolution that was used before the set of predefined conditions were satisfied, or another low resolution. In other embodiments, the act of continuing classifying the pages of the print job into the groups can involve switching from classifying the pages of the print job into the groups using the rasterization of the pages at the low resolution to instead classifying the pages of the print job into the groups using a rasterization of the pages at a resolution that is higher than the low resolution, such as 600 dpi or 1200 dpi.

Eventually, the computer might stop finding new groups. However, the computer can be configured such that if after discontinuing the calculation of estimated amounts of ink for the pages classified into at least the subset of the groups, the computer determines that at least one page has been classified into a new group different from the previous groups, the computer can responsively resume the calculation of estimated amounts of ink only for pages classified into the new group, such as by performing the operations described at block 306 for the new group.

Other conditions might cause the computer to resume ink use estimation as well. In some embodiments, for instance, the computer can be configured such that, after discontinuing the calculation of estimated amounts of ink for the pages classified into at least the subset of the groups, the computer periodically resumes, at predefined intervals, the calculation of estimated amounts of ink for the pages classified into at least the subset of the groups. Various predefined intervals can be used in such embodiments. For example, the computer can be configured to resume ink use estimation every x pages, where x is an integer that is greater than zero, and continue ink use estimation for a predefined period of time and/or for a predefined number of pages. The predefined intervals can be selected based on various factors, such as a total number of pages in the print job (e.g., for a print job of one million pages, resume estimation every ten thousand pages). As a more particular example, the computer can periodically resume ink use estimation every ten thousand pages for one hundred pages, before again discontinuing ink use estimation until the next ten thousand page mark.

Periodically resuming ink use estimation in the manners discussed above can be a precautionary measure that helps the computer detect situations in which the average ink use for at least one group has moved. In situations where the computer detects that the average ink use for a particular group has deviated more than a threshold amount from the average ink use for that group at the time the set of predefined conditions were satisfied, the computer can be configured to resume both page classification and ink use estimation (i.e., the operations described with respect to blocks 304 and 306) until the set of predefined conditions are satisfied again or until another, different condition is met.

Referring back to FIG. 3, block 312 of method 300 involves calculating, by the computer, for each of the groups, an estimated total amount of ink required for printing the pages in the group based on the estimated average amount of ink for the group and a number of pages in the group. Because the term "print job" used herein encompasses however many copies of the pages of a document are requested, the term "a number of pages in the group" refers to however many pages are in the group multiplied by however many copies were requested.

Block 314 of method 300 involves communicating, by the computer, to a client terminal, an estimated total amount of ink required for printing the print job, wherein the estimated total amount of ink is based on the estimated total amounts of ink for the groups. For example, the estimated total amount of ink for the print job can be displayed on a display device of the computer or transmitted to a client terminal that is remote from the computer.

In some embodiments, the computer can also determine a cost associated with the estimated total amount of ink required for printing the print job and comminute that cost to the client terminal. For example, the cost can be displayed on a display device of the computer or transmitted to a client terminal that is remote from the computer.

In some embodiments, the computer can continue classifying the pages of the print job into the groups until all of the pages of the print job have been classified into the groups. In other embodiments, the computer can be configured to track the variability in how many pages are in each group and use that variability as an additional or alternative basis to decide when to stop classifying, such as when the classification distribution settles. To facilitate this, while classifying the pages of the print job into the groups, the computer can (i) calculate a percent distribution that includes, for each of the groups, a percentage of the pages of the print job that have been classified into the group and (ii) determine that the percent distribution satisfies a second set of predefined conditions. In response to determining that the percent distribution satisfies the second set of predefined conditions, the computer can discontinue the classification of the pages of the print job. The second set of predefined conditions can include one or more conditions, such as a condition that a standard deviation of the percent distribution is less than a predefined threshold distribution deviation (and perhaps a condition that the percent distribution remains less than that threshold for a threshold period of time). For example, the percent distribution for a print job might at first comprise approximately 30% of pages in Group A, 20% of the pages in Group B, and 50% of the pages in Group C, but over time each of the percentages might regress to a mean, at which point the computer can discontinue classifying. Further, after discontinuing the classification of the pages of the print job, the computer might periodically resume, at predefined intervals, the classification of the pages of the print job. The predefined intervals can be the same as or different from the predefined intervals selected for use in determining when to resume both page classification and ink use estimation, as described above. In embodiments where the percent distribution is determined, the act of calculating, for each of the groups, the estimated total amount of ink required for printing the pages in the group can be performed based at least in part on the percent distribution as well.

By using the accelerated ink use estimation process described above, accuracy for ink use estimation can be improved and such accurate ink use estimation can be performed in less time than in existing estimation systems. Thus, the resulting cost estimates that are provided to customers can be made more accurate as well and can be timely provided. Further, this process can be used to perform ink use estimation for more than just a portion of the print job without sacrificing performance or efficiency, thus improving over existing estimation systems that use only a small portion of the print job to estimate ink use.

It should be understood that, while the accelerated ink use estimation process described above with respect to method 300 involves classifying pages of the print job into multiple groups, method 300 can also be performed without classifying pages into multiple groups and instead treating all of the pages as part of a single group into which all pages of the print job are classified by default. In such an embodiment, the other operations described above with respect to the accelerated ink use estimation process can occur as described above with respect to that single group.

B. Adaptive Ink Use Estimation

Figure 4:
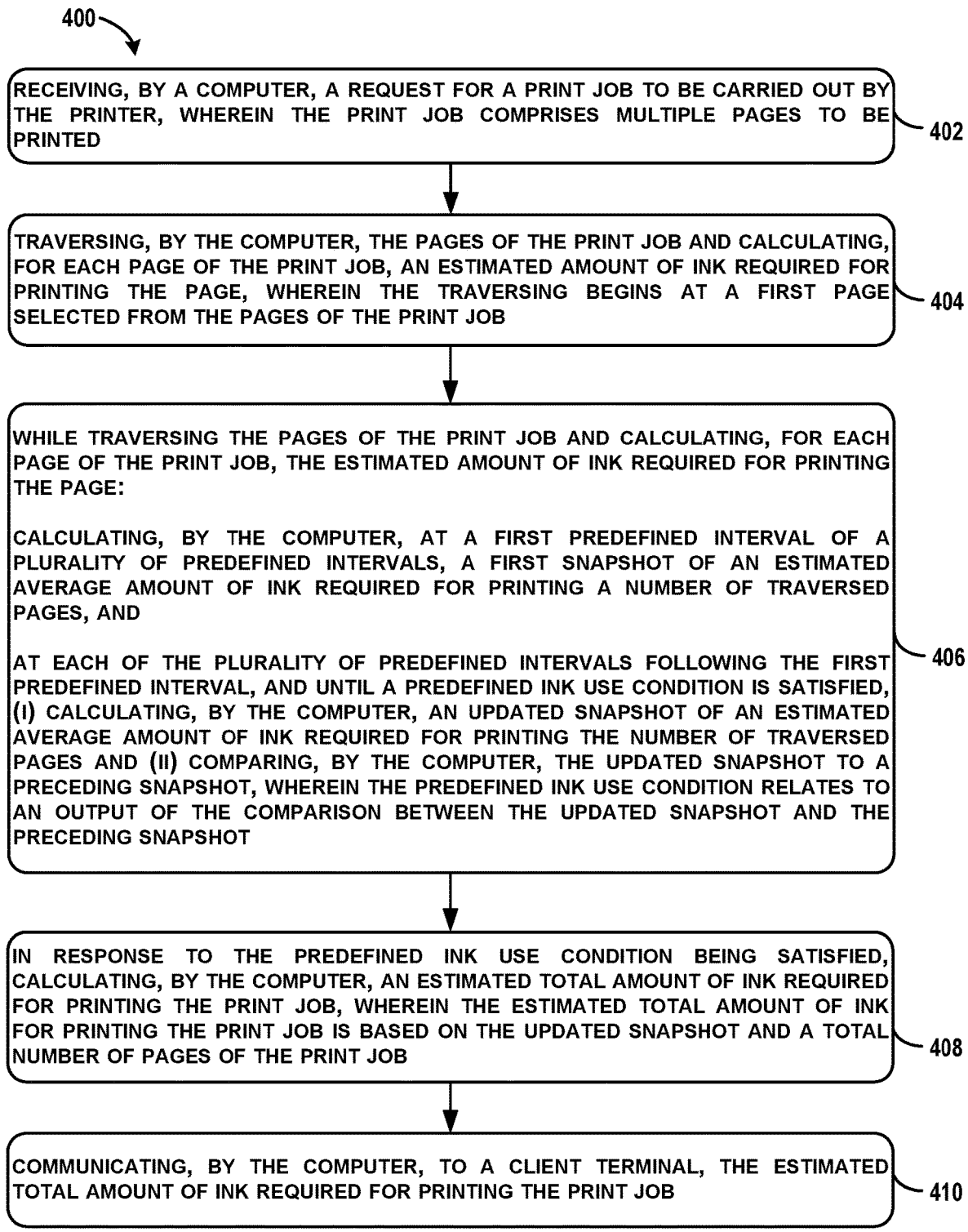
FIG. 4 illustrates another flowchart for estimating ink use by a printer, in accordance with at least some example embodiments.

FIG. 4 is a flowchart for a method, in accordance with at least some example embodiments. Method 400 represents a method for estimating ink use by a printer, which will be referred to herein as a method for "adaptive ink use estimation." Method 400 can be carried out by a computing device, such as the estimation system 102 and/or the controller 152 of the printing system 150. As noted above, the method 400 for adaptive ink use estimation can be used on its own, or in combination with the method 200 for accelerated ink use estimation.

Block 402 of method 400 involves receiving, by a computer, a request for a print job to be carried out by the printer, wherein the print job comprises multiple pages to be printed.

Block 404 of method 400 involves traversing, by the computer, the pages of the print job and calculating, for each page of the print job, an estimated amount of ink required for printing the page, wherein the traversing begins at a first page selected from the pages of the print job.

In some embodiments, the first page is a page designated in the request as being a sequentially first page of the print job (e.g., the first page of a document that is to be printed), and the computer begins traversing the pages starting at this page. In an alternative embodiment, the computer can generate a random set of pages and estimate ink use using those pages. That is, before traversing the pages of the print job, the computer can select a random set of the pages of the print job and designate one of those pages as the "first page." For example, the computer might choose the first page at random, or can select the page that is sequentially earliest among the random set (e.g., if the random pages include page 11, page 17, page 50, and page 101, the first page could be page 11). In this alternative embodiment, the act of traversing the pages of the print job and calculating, for each page of the print job, the estimated amount of ink required for printing the page can involve traversing the random set of the pages of the print job and calculating, for each page of the random set of the pages of the print job, the estimated amount of ink required for printing the page.

Referring back to FIG. 4, block 406 of method 400 involves while traversing the pages of the print job and calculating, for each page of the print job, the estimated amount of ink required for printing the page: calculating, by the computer, at a first predefined interval of a plurality of predefined intervals, a first snapshot of an estimated average amount of ink required for printing a number of traversed pages, and at each of the plurality of predefined intervals following the first predefined interval, and until a predefined ink use condition is satisfied, (i) calculating, by the computer, an updated snapshot of an estimated average amount of ink required for printing the number of traversed pages and (ii) comparing, by the computer, the updated snapshot to a preceding snapshot, wherein the predefined ink use condition relates to an output of the comparison between the updated snapshot and the preceding snapshot. Thus, when the estimated average ink use is updated, the computer can compare that estimate with one or more previous estimates, evaluate the difference between them, and determine whether additional ink use estimation would be beneficial to increase the ink use estimation accuracy.

In some examples, the predefined ink use condition can be or include a condition that a difference between the updated snapshot and the preceding snapshot is less than a predefined ink use change threshold.

In other examples, at the predefined intervals, and as part of the snapshots, the computer can calculate a standard deviation of the estimated amount of ink for printing the number of pages traversed thus far and the predefined ink use condition can be or include a condition that an overall standard deviation of the snapshots is less than a predefined threshold deviation, or that the overall standard deviation of the snapshots remains less than the predefined threshold deviation across a predefined number of traversed pages. Consider, for instance, a situation in which after a particular snapshot has been calculated, the overall standard deviation is 5.48, after which another snapshot is taken after the ink use of the next four pages is estimated to be 13, 10, 9, 12, which have a standard deviation of 1.58 and bring the overall standard deviation to 4.83. If the predefined threshold deviation is 5, then the predefined ink use condition would be satisfied.

In other examples, the predefined ink use condition can be or include a condition that differences between updated snapshots and preceding snapshots have remained less than a predefined ink use change threshold (e.g., the same predefined ink use change threshold as the aforementioned condition, or a different change threshold) across a predefined number of traversed pages. Other example conditions are possible as well, including those described above with respect to method 300 (e.g., the standard deviation of the standard deviations being less than a second predefined deviation threshold), which can be applied in the context of method 400 as well.

The operations of block 406 relate to the computer taking snapshots of the average ink use at particular intervals. Examples of these intervals will now be described in more detail.

In one example of the predefined intervals, the computer can calculate the first snapshot after n pages have been traversed, and then, every n pages that are traversed, the computer can calculate an updated snapshot and compare that updated snapshot to the preceding snapshot. The value of n can be an integer, such as 10, 50, and 100. In some embodiments, an updated snapshot can be compared to only the most-recent preceding snapshot. In other embodiments, the updated snapshot can be compared to one or more preceding snapshots that were calculated within a predefined window of pages (e.g., within the last M pages from the calculation of the updated snapshot, where M is an integer). In still other embodiments, the updated snapshot can be compared to one or more preceding snapshots that were calculated within a predefined window of snapshots (e.g., within the last P snapshots from the calculation of the updated snapshot, where P is an integer). For instance, for P=5, the updated snapshot can be compared to the last 5 snapshots, even if there have been 20 snapshots total.

In some embodiments, the computer can be configured to select n based on a manual use input, or automatically based on other factors, such as a size of the print job. For instance, if the print job has a total of over one million pages, the computer might select a value of n according to mapping data that maps print jobs having over one million pages to n=100.

In some embodiments, the value of n can be the same throughout the ink use estimation process. In other embodiments, however, the value of n can change during the process. For example, the computer can dynamically determine n based on how the estimated average ink use is changing over time. As a more particular example, when the difference in estimated average ink use settles down, the value of n can be increased.

To facilitate this, while traversing the pages of the print job and calculating, for each page of the print job, the estimated amount of ink required for printing the page, the computer can dynamically determine n based on a subset of the calculated snapshots from a predefined sliding window of pages. In other embodiments, the computer can dynamically determine n based on a subset of the calculated snapshots from a predefined sliding window of snapshots. For instance, for P=5, even if there are 20 snapshots total, only the last 5 snapshots might be used to determine when to stop estimating ink use.

In an example, the computer can be configured to increase n (thus skipping more pages and performing less estimates) when the estimated average amounts of ink from the subset increase (e.g., increase more than a threshold amount) and to decrease n (thus skipping less pages and performing more estimates) when the estimated average amounts of ink from the subset decrease (e.g., decrease more than a threshold amount). To facilitate this, for example, the computer can store mapping data that maps values of n to corresponding values by which the estimated average amounts of ink from the subset have increased, as well as to corresponding values by which the estimated average amounts of ink from the subset have decreased, and can select n based on a determination of how the estimated average amounts of ink from the subset have increased or decreased.

In another example, the computer can be configured to increase n when the standard deviation of the estimated average amounts of ink from the subset decreases (e.g., is lower than a first predefined threshold standard deviation) and to decrease n when the standard deviation of the estimated average amounts of ink from the subset increases (e.g., exceeds a second predefined threshold standard deviation). To facilitate this, for example, the computer can store mapping data that maps values of n to corresponding standard deviation values, and can select n based on a determination of the standard deviation. Other example manners of determining n are possible as well.

In another example of the predefined intervals relating to block 406, the computer can calculate the first snapshot after m seconds have elapsed since traversing the first page, and then, every m seconds thereafter, the computer can calculate an updated snapshot and compare that updated snapshot to the preceding snapshot. The value of m can be an integer, such as 2, 30, and 70. In some embodiments, an updated snapshot can be compared to only the most-recent preceding snapshot. In other embodiments, the updated snapshot can be compared to one or more preceding snapshots that were calculated within a predefined window of time (e.g., within the last five minutes from the calculation of the updated snapshot).

In some embodiments, the computer can be configured to select m based on a manual use input, or automatically based on other factors, such as a size of the print job. For instance, if the print job has a total of over one million pages, the computer might select a value of m according to mapping data that maps print jobs having over one million pages to m=70.

In some embodiments, the value of m can be the same throughout the ink use estimation process. In other embodiments, however, the value of m can change during the process. For example, the computer can dynamically determine m based on how the estimated average ink use is changing over time.

To facilitate this, while traversing the pages of the print job and calculating, for each page of the print job, the estimated amount of ink required for printing the page, the computer can dynamically determine m based on a subset of the calculated snapshots from a predefined sliding window of pages. In other embodiments, the computer can dynamically determine m based on a subset of the calculated snapshots from a predefined sliding window of snapshots. In still other embodiments, the computer can dynamically determine m based on a subset of the calculated snapshots from a predefined sliding window of time.

In an example, the computer can be configured to increase m (thus calculating estimates less frequently) when the estimated average amounts of ink from the subset increase (e.g., increase more than a first threshold amount) and to decrease m (thus calculating estimates more frequently) when the estimated average amounts of ink from the subset decrease (e.g., decrease more than a second threshold amount). To facilitate this, for example, the computer can store mapping data that maps values of m to corresponding values by which the estimated average amounts of ink from the subset have increased, as well as to corresponding values by which the estimated average amounts of ink from the subset have decreased, and can select m based on a determination of how the estimated average amounts of ink from the subset have increased or decreased.

In another example, the computer can be configured to increase m when the standard deviation of the estimated average amounts of ink from the subset decreases (e.g., is lower than the first predefined threshold standard deviation) and to decrease m when the standard deviation of the estimated average amounts of ink from the subset increases (e.g., exceeds the second predefined threshold standard deviation). To facilitate this, for example, the computer can store mapping data that maps values of m to corresponding standard deviation values, and can select m based on a determination of the standard deviation. Other example manners of determining m are possible as well.

Referring back to FIG. 4, block 408 of method 400 involves in response to the predefined ink use condition being satisfied, calculating, by the computer, an estimated total amount of ink required for printing the print job, wherein the estimated total amount of ink for printing the print job is based on the updated snapshot and a total number of pages of the print job.

In some embodiments, further in response to the predefined ink use condition being satisfied, the computer can also discontinue the traversal of the pages of the print job, the calculation of estimated amounts of ink required for printing the pages of the print job, the calculation of updated snapshots, and the comparison of updated snapshots to preceding snapshots. The computer can be configured to resume one or more of these operations if certain conditions are met, such as the computer receiving an error code or upon manual direction by a user.

Referring back to FIG. 4, block 410 of method 400 involves communicating, by the computer, to a client terminal, the estimated total amount of ink required for printing the print job. For example, the estimated total amount of ink for the print job can be displayed on a display device of the computer or transmitted to a client terminal that is remote from the computer.

In some embodiments, the computer can also determine a cost associated with the estimated total amount of ink required for printing the print job and comminute that cost to the client terminal. For example, the cost can be displayed on a display device of the computer or transmitted to a client terminal that is remote from the computer.

The adaptive ink use estimation process described above provides a more deterministic way to subsample a job when performing ink estimation. Instead of relying on users or print shop customers to select a reasonable subset of the print job, the computer can track how per-page ink use estimation varies and use that variation to decide when enough of the print job has been estimated. This can be less complex than existing estimation systems in that there is less room for user error and in that a desirable subset of the print job can be selected (i.e., enough of the print job to facilitate an accurate estimation, but not so much of the print job that more computational resources will be used than desired).

Additionally, by using the adaptive ink use estimation process described above, accurate ink use estimation can be performed in less time than in existing estimation systems. Thus, the resulting cost estimates that are provided to customers can be made more accurate as well and can be timely provided. Further, this process can be used to perform ink use estimation for more than just a portion of the print job without sacrificing performance or efficiency, thus improving over existing estimation systems that use only a small portion of the print job to estimate ink use.

C. Comingled Ink Use Estimation

Figure 5:
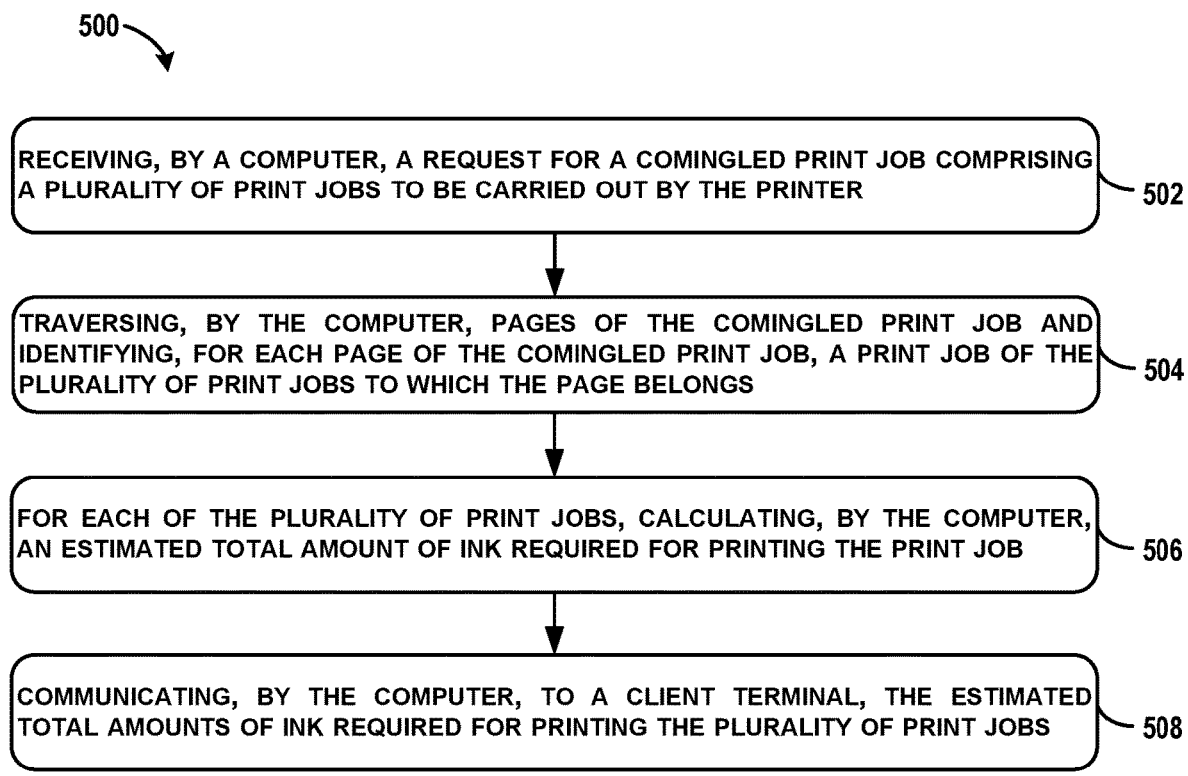
FIG. 5 illustrates another flowchart for estimating ink use by a printer, in accordance with at least some example embodiments.

FIG. 5 is a flowchart for a method, in accordance with at least some example embodiments. Method 500 represents a method for estimating ink use by a printer, particularly when the print job is a comingled print job. Method 500 can be carried out by a computing device, such as the estimation system 102 and/or the controller 152 of the printing system 150.

Block 502 of method 500 involves receiving, by a computer, a request for a comingled print job comprising a plurality of print jobs to be carried out by the printer.

Block 504 of method 500 involves traversing, by the computer, pages of the comingled print job and identifying, for each page of the comingled print job, a print job of the plurality of print jobs to which the page belongs.

To facilitate this, the computer can select a first page from the pages of the comingled print job. For instance, the first page can be a page designated in the request as being a sequentially first page of the comingled print job. The computer can then identify that the first page belongs to a first print job of the plurality of print jobs and begin traversing pages following the first page until the computer identifies that a second page of the comingled print job belongs to a second print job of the plurality of print jobs, different from the first print job. In contrast to the "first page" noted above, and although the second page might happen to be the sequentially second page designated in the request, the term "second page" (and similarly, terms such as "third page," etc.) might not refer to where the page falls sequentially relative to the other pages in the comingled print job, but rather to the second page identified as part of this traversing/identification process.

In some situations, print jobs that make up the comingled print job can be interleaved with each other such that the computer switches from job to job while traversing the pages of the comingled print job. For example, a comingled print job can include 20 jobs and the computer might be configured to switch between them every 2-3 sheets.

In response to identifying that the second page of the comingled print job belongs to the second print job, the computer can identify the traversed pages between the first page and the second page as belonging to the first print job. The computer might then continue traversing until identifying yet another page (e.g., a third page) as belonging to a new print job (i.e., "third print job"), and so on until all of the pages of the comingled print job have been identified as belonging to a particular print job of the comingled print job. For example, the computer can identify page 1 as belonging to Print Job A and can continue to traverse pages until page 100, which the computer might identify as belonging to Print Job B, and then continue to traverse pages until page 280, which the computer might identify as belonging to Print Job C. The computer can thus identify page 1 through page 99 as belonging to Print Job A, and identify page 100 through page 279 as belonging to Print Job B, etc.

As an example of how the computer distinguishes between when a traversed page belongs to a new print job versus a previously-identified print job, there can be metadata in the single print file representing the comingled print job representing the jobs that make up the comingled job, and this metadata can be referred to in order to identify the pages with which a job belongs (e.g., PDF/vt metadata). Additionally or alternatively, a comingled print job can include computer-readable barcodes, where each individual job of the comingled job has its own barcode. Such a barcode can have a format of <ID><current sheet><total number of sheets><current record><total number of records>, for example, and can be used to verify that all records are printed and that within each record sheets are neither missing nor duplicated. Even if pages of the comingled print job are traversed randomly, the print jobs that make up the comingled print job can be identified using the metadata and/or barcodes, since the data in the metadata and/or barcodes can include unique identifiers for each job.

Referring back to FIG. 5, block 506 of method 500 involves for each of the plurality of print jobs, calculating, by the computer, an estimated total amount of ink required for printing the print job.

In some embodiments, the act of calculating, for each of the plurality of print jobs, the estimated total amount of ink required for printing the print job can involve calculating, for each of a plurality of pages of each of the plurality of print jobs, an estimated amount of ink required for printing the page. The plurality of pages for a given print job can include all of the pages of that print job, or a portion of the pages.

In some embodiments, the act of calculating, for each of the plurality of print jobs, the estimated total amount of ink required for printing the print job can be accomplished using the accelerated ink use estimation process described above and/or the adaptive ink use estimation process described above.

Referring back to FIG. 5, block 508 of method 500 involves communicating, by the computer, to a client terminal, the estimated total amounts of ink required for printing the plurality of print jobs. For example, the computer can separately communicate, to the client terminal (or to multiple separate client terminals, such as client terminals operated by the different entities with which the print jobs of the comingled print job are associated), the estimated total amount of ink for each of the plurality of print jobs.

In some embodiments, the computer can also determine a cost associated with the estimated total amount of ink required for printing each print job and communicate those costs to one or more client terminals. For example, the respective costs can be separately communicated to multiple different client terminals that are remote from the computer, such as client terminals operated by the different entities with which the print jobs of the comingled print job are associated. As another example, the costs can be displayed simultaneously or non-simultaneously on a display device of the computer. Other examples are possible as well.

Given that comingled print jobs may use vastly different quantities of ink, it is important for the print shops to understand the cost for the individual jobs in the comingled print jobs. The method 500 for estimating ink use in a comingled print job can help ensure that each print job can be accurately and efficiently estimated and priced, as opposed to how existing estimation systems might, in contrast, estimate the comingled print job as one job and have low coverage print jobs subsidize the cost of high coverage print jobs.

V. CONCLUSION

The illustrative embodiments described in the detailed description, figures, and claims are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the ladder diagrams, scenarios, and flow charts in the figures and as discussed herein, each block and/or communication may represent a processing of information and/or a transmission of information in accordance with example embodiments. Alternative embodiments are included within the scope of these example embodiments. In these alternative embodiments, for example, functions described as blocks, transmissions, communications, requests, responses, and/or messages may be executed out of order from that shown or discussed, including substantially concurrent or in reverse order, depending on the functionality involved. Further, more or fewer blocks and/or functions may be used with any of the ladder diagrams, scenarios, and flow charts discussed herein, and these ladder diagrams, scenarios, and flow charts may be combined with one another, in part or in whole.

A block that represents a processing of information may correspond to circuitry that can be configured to perform the specific logical functions of a method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A computer-implemented method for estimating ink use by a printer, the method comprising:
   receiving, by a computer, a request for a print job to be carried out by the printer;
   classifying, by the computer, pages of the print job into groups, each group corresponding to related pages of the print job;
   for each of the groups:
      calculating, by the computer, for each page classified into the group, an estimated amount of ink required for printing the page, and
      calculating, by the computer, an estimated average amount of ink required for printing pages of the group based on the estimated amounts of ink required for printing the pages of the group;
   determining, by the computer, that the estimated average amount of ink for at least a subset of the groups satisfies a set of predefined conditions;
   in response to determining that the estimated average amount of ink for at least the subset of the groups satisfies the set of predefined conditions, discontinuing, by the computer, the calculation of estimated amounts of ink for pages classified into at least the subset of the groups;
   calculating, by the computer, for each of the groups, an estimated total amount of ink required for printing the pages in the group based on the estimated average amount of ink for the group and a number of pages in the group; and
   communicating, by the computer, to a client terminal, an estimated total amount of ink required for printing the print job, wherein the estimated total amount of ink is based on the estimated total amounts of ink for the groups.

2. The method of claim 1, further comprising:
   in response to determining that the estimated average amount of ink for at least the subset of the groups satisfies the set of predefined conditions, continuing, by the computer, classifying the pages of the print job into the groups.

3. The method of claim 2, wherein continuing classifying the pages of the print job into the groups comprises continuing classifying the pages of the print job into the groups until all of the pages of the print job have been classified into the groups.

4. The method of claim 2, wherein classifying the pages of the print job into the groups comprises classifying the pages of the print job into the groups using a rasterization of the pages at a low resolution, and
wherein continuing classifying the pages of the print job into the groups comprises continuing classifying the pages of the print job into the groups using the rasterization of the pages at the low resolution.

5. The method of claim 2, wherein classifying the pages of the print job into the groups comprises classifying the pages of the print job into the groups using a rasterization of the pages at a low resolution, and
wherein continuing classifying the pages of the print job into the groups comprises switching from classifying the pages of the print job into the groups using the rasterization of the pages at the low resolution to instead classifying the pages of the print job into the groups using a rasterization of the pages at a resolution that is higher than the low resolution.

6. The method of claim 1, wherein calculating the estimated amount of ink for each page classified into the group comprises calculating the estimated amount of ink for each page classified into the group based on a rasterization of the page at a high resolution.

7. The method of claim 1, further comprising:
while classifying the pages of the print job into the groups:
calculating, by the computer, a percent distribution comprising, for each of the groups, a percentage of the pages of the print job that have been classified into the group,
determining, by the computer, that the percent distribution satisfies a second set of predefined conditions; and
in response to determining that the percent distribution satisfies the second set of predefined conditions, discontinuing, by the computer, the classification of the pages of the print job,
wherein calculating, for each of the groups, the estimated total amount of ink required for printing the pages in the group is further based on the percent distribution.

8. The method of claim 7, further comprising:
after discontinuing the classification of the pages of the print job, periodically resuming, by the computer, at predefined intervals, the classification of the pages of the print job.

9. The method of claim 1, further comprising:
after discontinuing the calculation of estimated amounts of ink for the pages classified into at least the subset of the groups, periodically resuming, by the computer, at predefined intervals, the calculation of estimated amounts of ink for the pages classified into at least the subset of the groups.

10. The method of claim 1, further comprising:
after discontinuing the calculation of estimated amounts of ink for the pages classified into at least the subset of the groups, determining, by the computer, that at least one page has been classified into a new group different from the previous groups; and
in response to determining that the at least one page has been classified into the new group different from the previous groups, resuming, by the computer, the calculation of estimated amounts of ink only for pages classified into the new group.

11. The method of claim 1, wherein the set of predefined conditions comprises a condition that a standard deviation of the estimated average amount of ink per page for each group of at least the subset of the groups remains less than a predefined threshold deviation across a predefined number of pages that have been classified by the computer.

12. The method of claim 1, wherein the set of predefined conditions comprises a condition that a standard deviation of the estimated average amount of ink per page for each group of at least the subset of the groups remains less than a predefined threshold deviation across a predefined number of snapshots taken by the computer of estimated average amounts of ink per page for the group.

13. The method of claim 1, wherein the set of predefined conditions comprises a condition that a standard deviation of the estimated average amount of ink per page for each group of at least the subset of the groups is less than a predefined threshold deviation for longer than a predefined duration of time.

14. The method of claim 1, further comprising:
determining, by the computer, a cost associated with the estimated total amount of ink required for printing the print job; and
communicating, by the computer, to the client terminal, the cost associated with the estimated total amount of ink required for printing the print job.

15. A system comprising:
a memory that stores instruction code; and
a processor in communication with the memory, wherein the instruction code is executable by the processor to perform operations comprising:
receiving a request for a print job to be carried out by a printer;
classifying pages of the print job into groups, each group corresponding to related pages of the print job;
for each of the groups:
calculating, for each page classified into the group, an estimated amount of ink required for printing the page, and
calculating an estimated average amount of ink required for printing pages of the group based on the estimated amounts of ink required for printing the pages of the group;
determining that the estimated average amount of ink for at least a subset of the groups satisfies a set of predefined conditions;
in response to determining that the estimated average amount of ink for at least the subset of the groups satisfies the set of predefined conditions, discontinuing the calculation of estimated amounts of ink for pages classified into at least the subset of the groups;
calculating, for each of the groups, an estimated total amount of ink required for printing the pages in the group based on the estimated average amount of ink for the group and a number of pages in the group; and
communicating, to a client terminal, an estimated total amount of ink required for printing the print job, wherein the estimated total amount of ink is based on the estimated total amounts of ink for the groups.

16. The system of claim 15, the operations further comprising:
in response to determining that the estimated average amount of ink for at least the subset of the groups satisfies the set of predefined conditions, continuing classifying the pages of the print job into the groups.

17. The system of claim 16, wherein continuing classifying the pages of the print job into the groups comprises continuing classifying the pages of the print job into the groups until all of the pages of the print job have been classified into the groups.

18. The system of claim 16, wherein classifying the pages of the print job into the groups comprises classifying the pages of the print job into the groups using a rasterization of the pages at a low resolution, and wherein continuing classifying the pages of the print job into the groups comprises continuing classifying the pages of the print job into the groups using the rasterization of the pages at the low resolution.

19. The system of claim 16, wherein classifying the pages of the print job into the groups comprises classifying the pages of the print job into the groups using a rasterization of the pages at a low resolution, and wherein continuing classifying the pages of the print job into the groups comprises switching from classifying the pages of the print job into the groups using the rasterization of the pages at the low resolution to instead classifying the pages of the print job into the groups using a rasterization of the pages at a resolution that is higher than the low resolution.

20. An article of manufacture comprising non-transitory data storage storing at least computer-readable instructions that, when executed by one or more processors of a computer, cause the computer to perform operations comprising:

receiving a request for a print job to be carried out by a printer;

classifying pages of the print job into groups, each group corresponding to related pages of the print job;

for each of the groups:
  calculating, for each page classified into the group, an estimated amount of ink required for printing the page, and
  calculating an estimated average amount of ink required for printing pages of the group based on the estimated amounts of ink required for printing the pages of the group;

determining that the estimated average amount of ink for at least a subset of the groups satisfies a set of predefined conditions;

in response to determining that the estimated average amount of ink for at least the subset of the groups satisfies the set of predefined conditions, discontinuing the calculation of estimated amounts of ink for pages classified into at least the subset of the groups;

calculating, for each of the groups, an estimated total amount of ink required for printing the pages in the group based on the estimated average amount of ink for the group and a number of pages in the group; and communicating, to a client terminal, an estimated total amount of ink required for printing the print job, wherein the estimated total amount of ink is based on the estimated total amounts of ink for the groups.

* * * * *